J. A. BRIED.
VELOCIPEDE.
APPLICATION FILED APR. 16, 1917.
1,258,391.
Patented Mar. 5, 1918.
2 SHEETS—SHEET 1.
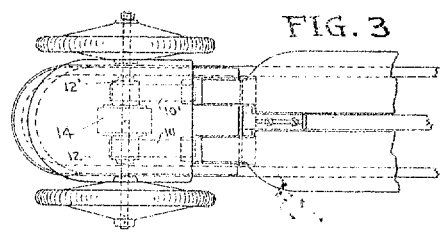
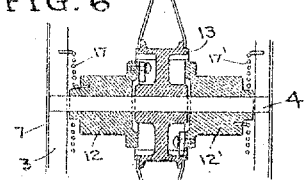
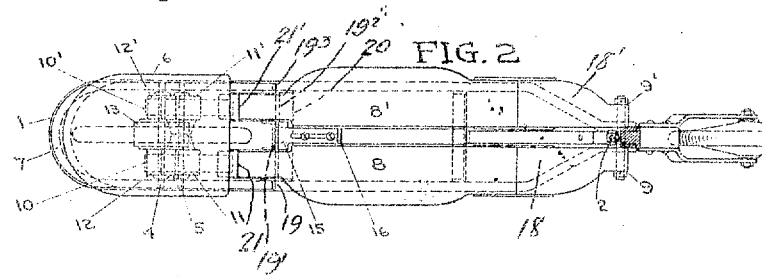
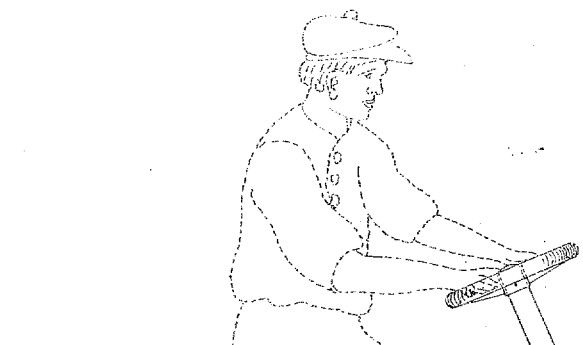
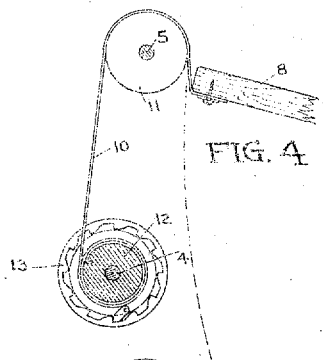
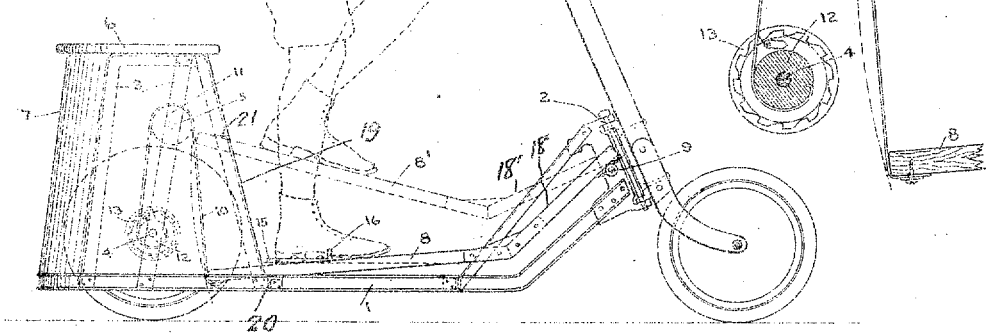
WITNESSES:
Willard W. King.
Clement L. Bried
INVENTOR.
Julien A. Bried.

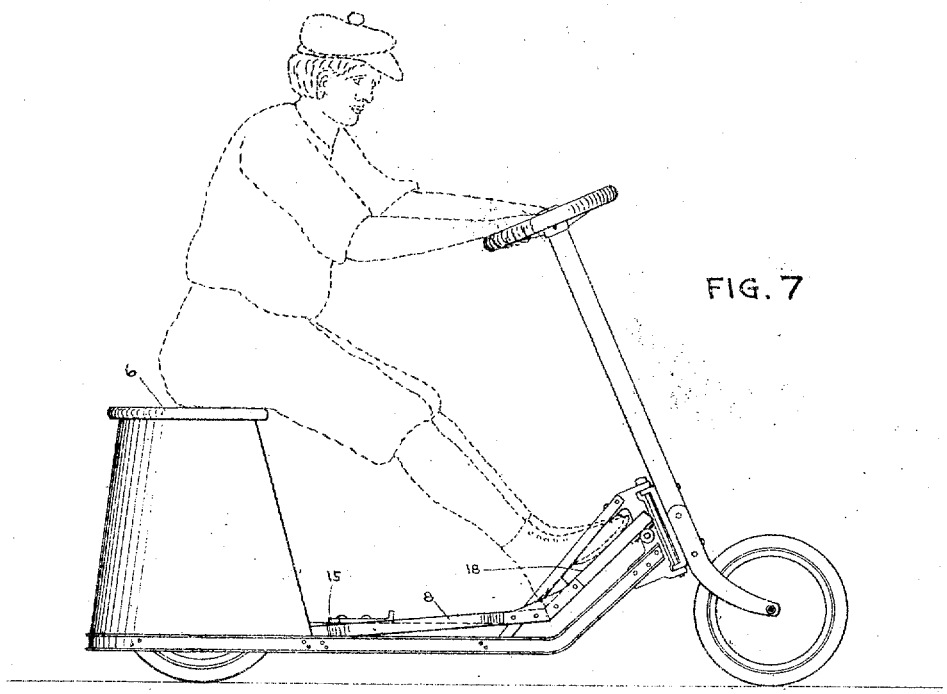

UNITED STATES PATENT OFFICE.

JULIEN A. BRIED, OF OAKLAND, CALIFORNIA.

VELOCIPEDE.

1,258,391.  Specification of Letters Patent.  Patented Mar. 5, 1918.

Application filed April 16, 1917. Serial No. 162,582.

*To all whom it may concern:*

Be it known that I, JULIEN A. BRIED, a citizen of the United States, residing at Oakland, in the county of Alameda and State of California, have invented a new and useful Improvement in Velocipedes, of which the following is a specification and which is illustrated in the accompanying drawings.

My invention relates to the improvements in velocipedes particularly of the two and three wheel type commonly known as bicycles and tricycles respectively and has for its object the production of a vehicle which may be propelled by the rider in a standing position on the vehicle with a foot and leg motion closely simulating walking and also to permit the rider to stand still or sit down and "coast" without moving the feet, after having attained momentum.

I attain the objects outlined above by the device illustrated in the drawings accompanying this specification in which Figure 1 is a side elevation of my improved vehicle fitted with two wheels and showing a rider dotted in position.

Fig. 2 is a plan view of Fig. 1 with the steering post cut off just above the steering head and together with the steering wheel omitted to better show the treadles, while Fig. 3 is a similar view of the rear part of the vehicle arranged with a wheel on each side instead of one wheel in the center.

Figs. 4 and 5 show the ratchet driving device used on the rear shaft and Fig. 6 is a section through the main shaft showing the ratchet wheel clutch arrangement.

Fig. 7 is a side elevation of my vehicle with a rider shown in dotted lines seated in a coasting position with the treadles locked down.

The operation of my velocipede may be easily understood by a more detailed reference to the different views shown in the drawings and wherein all like members have the same reference numbers.

The vehicle as shown in Fig. 1 consists of a frame 1 serving to hold the front and rear wheels and various members in proper relation, this frame is normally within a few inches of the ground as shown and the forward end is turned upward and is pivoted at the steering head at 2. The rearward end carries a suitable framework 3 to support the main rear shaft 4 and the upper idler shaft 5 in position and also the seat 6 and a suitable housing 7 inclosing the mechanism and it also forms vertical guides 19, 19'—19²—19³, to support the oscillating ends of the treadles against being deflected sidewise.

Two treadles 8,—8' are arranged above the frame, these treadles have their forward ends 18, 18' turned upward and are pivotably supported at the steering head at 9,—9', the forward ends of the treadles being thus turned upwardly relative to the rear or foot-receiving portions is for two purposes, first to provide an upwardly slanted portion against which to rest the feet for greater comfort when coasting, as shown in Fig. 7, and secondly to provide a higher pivotal point for the treadles to give a better action to the rear ends and yet divide the angularity of the upper and lower positions of the foot or power-receiving portions. The rearward ends of the treadles are connected within the rear housing to belts 10,—10' which pass upward over idler pulleys 11,—11' thence downward and around and are secured to the hubs of revolving ratchets 12,—12', operating on both sides of a ratchet wheel hub 13 formed in the rear wheel when one wheel only is used to support the rear end of the vehicle, or on a double ratchet wheel hub attached to the shaft as shown in Fig. 3 at 14 when two wheels are used to support the rear end of the vehicle.

In Fig. 3 the upper idler shaft 5 and the idlers 11,—11' have been omitted to avoid confusion in the drawing.

The ratchets are attached to hubs to which the ends of the belts are secured and the hubs are loosely supported by the main shaft and are suitably spring actuated as indicated in the enlarged detail section of the clutch arrangement in Fig. 6 at 17,—17', so that their tendency is to wind up the belts and raise the rear ends of the treadles so that by depressing the treadles the ratchets engage the rear wheel, on the two wheel vehicle, or the ratchet wheel secured to the shaft on the three wheel vehicle, and turn it in a direction to cause forward movement of the vehicle.

When two wheels are used to support the rear end one only is secured to the shaft to act as a driver and the other is free to turn on the shaft.

It will be seen that the treadles as described are independent of each other, either one may be used alone, or they may be used alternately or simultaneously to effect forward movement of the vehicle, and since the ratchets only act in a forward direction, "coasting" or momentum riding is possible whether the treadles are up or down.

It will also be seen that under the conditions thus far described the vehicle could not be rolled backward without engaging the ratchets but by having the ratchet pawls gravity actuated and arranged on their supporting hubs so as to fall out of engagement when the treadles are fully depressed, the vehicle could be rolled freely either forward or backward when the treadles were both depressed.

This arrangement of one of the ratchets is shown in Figs. 4 and 5, both being enlarged detail drawings which should be considered diagrammatic, Fig. 4 showing the beginning of the stroke with the pawl at the bottom fallen into engagement and Fig. 5 the end of the stroke with the pawl on top fallen out of engagement with the ratchet wheel.

To bring the pawls in the proper position for automatically engaging and disengaging through the action of gravity I provide a definite stop 20 on the frame of the vehicle to limit the downward travel of the treadles, also stops 21,—21' to limit the upward travel of the treadles and I arrange the length of stroke and diameter of the hubs around which the belts are wrapped to result in about one and a half revolutions being given the hub at each stroke of a treadle, but the same conditions may be secured with about a half revolution.

To hold the treadles in a depressed position to release the ratchets and facilitate handling the vehicle, or "coasting" upon it when the rider is seated without the necessity of his holding the treadles down to avoid "clicking of the ratchets" I provide an auxiliary catch or bolt 15 secured to the frame and adapted to be operated by the foot through its upturned portion 16. Fig. 7 shows the treadles held down by the latch or bolt 15 and in dotted lines a rider seated with feet on the upwardly slanted coasting portions 18—18' of the treadles.

Having thus described my invention it will be seen that I have produced a new vehicle which while of the velocipede family and of which a great variety of forms have been produced appears to contain several elements of novelty and usefulness not contained in its predecessors in so far as I am aware and while I have shown and described a two and a three wheeled vehicle, the principle of a vehicle propelled by the rider in a standing position through a natural walking motion of the legs may also be applied to a four wheeled vehicle and I have therefore included it in my claims:—

I claim:

1. In a velocipede, a frame, a shaft at its rear end, a rear wheel on said shaft, a steering post pivotally connected to the front end of the frame, a front wheel supporting said steering post, two longitudinally disposed independently oscillating propelling treadles adapted to carry the full weight of a rider, said treadles being pivoted at their front ends to said frame, flexible devices each secured at one end to the rear end of one of the said treadles, idler wheels around which the devices extend, rotatable about horizontal axes above the said shaft, rotary devices loose on said shaft to which the other ends of the flexible devices are secured, and independent means for rotating the rear wheel from the rotation of said rotary devices.

2. In a velocipede, a frame, a shaft at its rear end, a rear wheel on said shaft, a steering post pivotally connected to the front end of the frame, a front wheel supporting said steering post, two longitudinally disposed independently oscillating propelling treadles adapted to carry the full weight of a rider, said treadles being pivoted at their front ends to said frame, flexible devices secured at one end each to a rear end of one of the said treadles, idler wheels around which the devices extend, rotatable about a horizontal shaft supported by the frame and passing over the rear wheel, rotary devices loose on said shaft to which the other ends of the flexible devices are secured, and independent means for rotating the rear wheel from the rotation of said rotary devices.

3. In a velocipede, a frame, a shaft at its rear end, a rear wheel on said shaft, a steering post pivotally connected to the front end of the frame, a front wheel supporting said steering post, two longitudinally disposed independently oscillating propelling treadles adapted to carry the full weight of a rider, said treadles being pivoted at their front ends to the forward part of the frame, their rearward ends being adapted to oscillate from a position above to a position below the said shaft, flexible devices secured at one end each to a rear end of one of the said treadles, idler wheels around which the devices extend rotatable about horizontal axes above the said shaft, rotary devices loose on said shaft to which the other ends of the flexible devices are secured, and independent means for rotating the rear wheel from the rotation of said rotary devices.

4. In a velocipede, a frame, a shaft at its rear end, a rear wheel on said shaft, a steering post pivotally connected to the front end of the frame, a front wheel supporting said steering post, independently oscillating propelling treadles pivoted at their front ends to said frame, guides secured to the said frame for guiding the rear ends of said treadles, and means independently operated by the rear ends of said treadles for rotating said rear wheel.

5. In a velocipede, a frame, a shaft at its rear end, a rear wheel on said shaft, a steering post pivotally connected to the front end of the frame, a front wheel supporting said steering post, independently oscillating propelling treadles pivoted at their front ends to said frame, means independently operated by the rear ends of said treadles for rotating said rear wheel, and a housing covering said operating means, the upper portion of which is shaped to serve as a seat.

6. In a velocipede, a frame, a shaft at its rear end, a rear wheel on said shaft, a steering post pivotally connected to the front end of the frame, a front wheel supporting said steering post, independently oscillating propelling treadles pivoted to said frame, said treadles each comprising a rearward power-receiving portion and a forward coasting portion extending upward from the power-receiving portion, a seat carried by the frame above the rear wheel and means independently operated by the rear ends of said treadles for rotating said rear wheel.

7. In a velocipede, a frame, a shaft at its rear end, a rear wheel on said shaft, a steering post pivotally connected to the front end of the frame, a front wheel supporting said steering post, two independently oscillating propelling treadles adapted to carry the full weight of a rider, said treadles being pivoted at their front ends to said frame above the level of said shaft, said treadles extending below the shaft in their lowest position and above the shaft in their highest position, flexible devices secured at one end to the rear ends of said treadles, idler wheels around which the devices extend, rotary devices loose on said shaft to which the other ends of the flexible devices are secured, and independent means for rotating the rear wheel from the rotation of said rotary devices.

8. In a velocipede, a frame, a shaft at its rear end, a rear wheel on said shaft, a steering post pivotally connected to the front end of the frame, a front wheel supporting said steering post, independently oscillating propelling treadles pivoted on said frame, means independently operated by said treadles for rotating said rear wheel and a latch for locking the treadles in their lowest positions.

9. In a velocipede, a frame, a shaft at its rear end, a rear wheel on said shaft, a steering post pivotally connected to the front end of the frame, a front wheel supporting said steering post, independently oscillating propelling treadles pivoted at their front ends to the frame, means on said frame to limit the downward movement of said treadles, individual rotary devices coaxial with the rear wheel and respectively operated by the rear ends of said treadles for rotating said rear wheel, and operative connections between said devices and the rear wheel, each connection being inoperative when the corresponding treadle is at rest in its lowermost position.

JULIEN A. BRIED.

Witnesses:
WILLARD W. KING,
CLEMENT L. BRIED.